United States Patent [19]

Hampo et al.

[11] Patent Number: 5,587,524

[45] Date of Patent: Dec. 24, 1996

[54] MISFIRE DETECTION ASSEMBLY

[75] Inventors: Richard J. Hampo, Livonia; Kenneth A. Marko, Ann Arbor; Bruce D. Bryant, Royal Oak, all of Mich.

[73] Assignee: Ford Motor Company, Dearborn, Mich.

[21] Appl. No.: 433,186

[22] Filed: May 3, 1995

[51] Int. Cl.⁶ .......................... G01M 15/00; G06F 15/20
[52] U.S. Cl. .......................... 73/116; 73/117.3; 123/419; 123/436; 364/431.03; 364/431.07
[58] Field of Search .................... 73/115, 116, 117.2, 73/117.3; 123/419, 425, 436; 364/431.03, 431.05, 431.07, 431.08

[56] References Cited

U.S. PATENT DOCUMENTS

| | | | |
|---|---|---|---|
| 5,153,834 | 10/1992 | Abo et al. | 364/431.08 |
| 5,237,862 | 8/1993 | Mangrulkar et al. | 73/116 |
| 5,263,365 | 11/1993 | Muller et al. | 364/431.08 |
| 5,267,164 | 11/1993 | Miyama | 364/431.08 |
| 5,307,671 | 5/1994 | Akase | 73/117.3 |
| 5,361,213 | 11/1994 | Fujieda et al. | 123/436 |
| 5,361,628 | 11/1994 | Marko et al. | 73/117.2 |
| 5,377,536 | 1/1995 | Angermaier et al. | 123/436 |
| 5,379,634 | 1/1995 | Kuroda et al. | 123/419 |
| 5,426,587 | 6/1995 | Imai et al. | 364/431.08 |
| 5,495,415 | 2/1996 | Ribbens et al. | 73/117.2 |

*Primary Examiner*—Richard Chilcot
*Assistant Examiner*—George M. Dombroske
*Attorney, Agent, or Firm*—Mark L. Mollon, Esq.; Roger L. May, Esq.

[57] ABSTRACT

A misfire detection assembly, used in conjunction with a motor vehicle having a fuel injector, an internal combustion engine and at least one output sensor, includes: a correlator which is electrically connected to the fuel injector and the output sensor wherein the correlator correlates firing events created by the fuel injector with an output signal created by the output sensor; a filter electrically connected to the correlator to receive the output signal and to compare the output signal against a variable threshold signal created by the filter; and a recorder, electrically connected to the filter, to record the firing events which exceed the variable threshold signal and those which do not exceed the variable threshold signal.

7 Claims, 5 Drawing Sheets

MISFIRE DETECTION ASSEMBLY

BACKGROUND OF THE INVENTION

1. Field of the Invention

The present invention relates generally to misfire detection and, more particularly, to optimize misfire detection of an internal combustion engine of a motor vehicle over many operating parameters.

2. Description of Related Art

With the regulations of motor vehicle emissions ever increasing, motor vehicle manufacturers have had to identify specific cylinders which misfire, an event that places unused fuels in the exhaust manifold which may eventually render catalytic converters ineffective. Misfire detectors have been moderately successful at identifying misfire cylinders. These detectors are not, however, capable of adapting to the ever changing environment in which the internal combustion engine is located. Some conditions which affect the detectors include, but are not limited to, acceleration, fuel mixture, environmental conditions (temperature, humidity), age of the internal combustion engine, and the like.

SUMMARY OF THE INVENTION

A misfire detection assembly for a motor vehicle is disclosed. The motor vehicle includes a fuel injector which defines firing events, and internal combustion engine and an output sensor for producing an output signal. The misfire detection assembly includes a correlator electrically connected to the fuel injector and the output sensor. The correlator correlates the firing events and the output signal. The misfire detection assembly further includes a filter electrically connected to the correlator to receive the output signal. The filter creates a threshold signal to compare the output signal thereagainst to identify the firing events exceeding the threshold signal. A recorder is electrically connected to the filter and records the firing events exceeding the threshold signal.

One advantage associated with the present invention is that the misfire detection assembly utilizes a filter to accurately determine when a misfire occurs wherein the filter includes a robust quality allowing the filter to operate in a number of conditions without minimizing the accuracy of the results using the filter.

Other advantages and features of the present invention will be readily appreciated as the same becomes better understood by reference to the subsequent description when considered in connection with the accompanying drawings.

DESCRIPTION OF THE PREFERRED EMBODIMENT(S)

Figure 1:
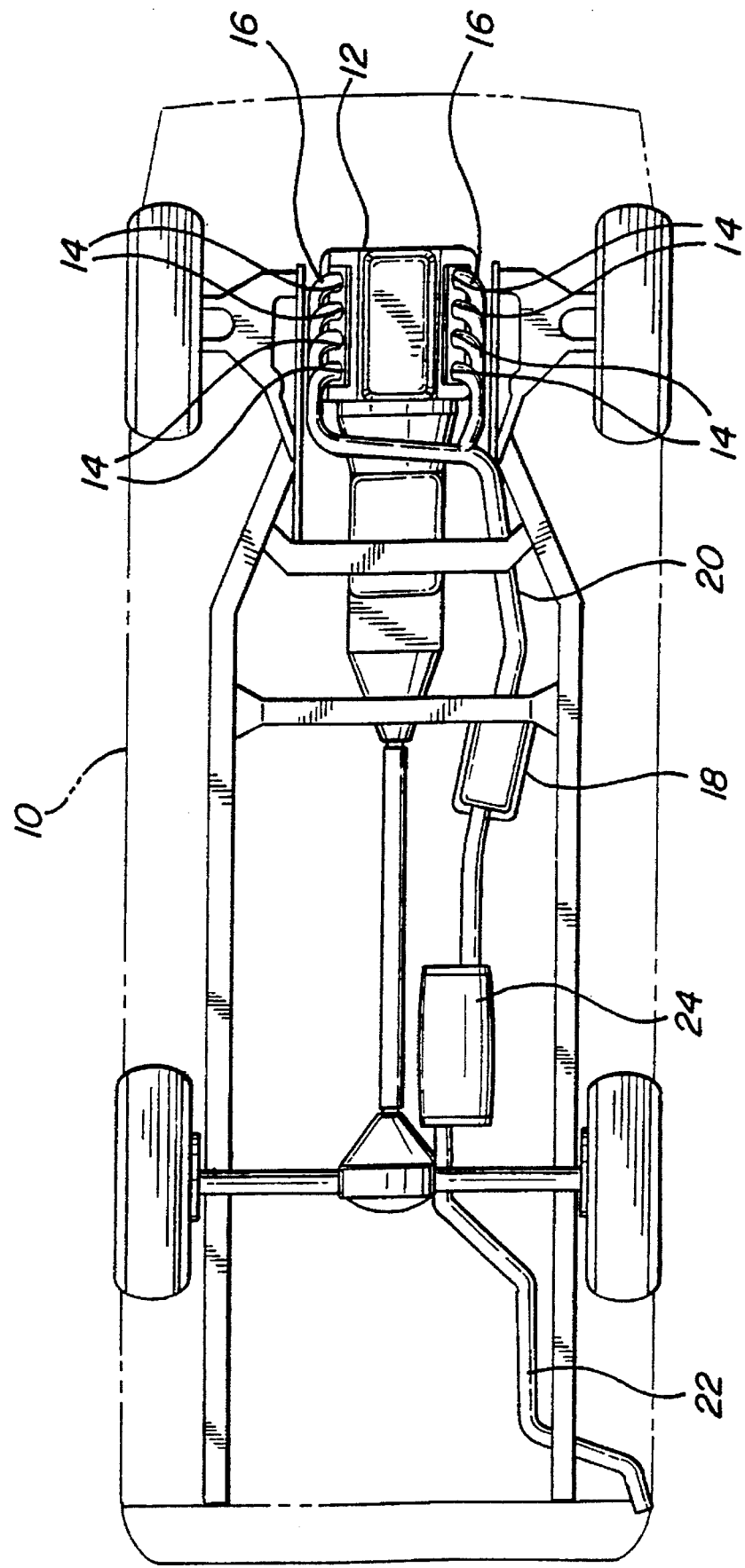
FIG. 1 is a top view of an engine and exhaust system for a motor vehicle with the motor vehicle shown in phantom.

Referring to FIG. 1, a motor vehicle is shown in phantom at 10. The motor vehicle 10 includes an internal combustion engine 12 having cylinders, represented by a plurality of inlet ports 14 of an exhaust manifold 16 through which exhaust fumes are emitted and sent to a catalytic converter 18 and out an exhaust pipe 20. The catalytic converter 18 houses a catalyst (not shown) which is a chemical used to react with the emissions from the cylinders to reduce emissions exiting a tailpipe 22 adjacent a muffler 24.

Figure 2:
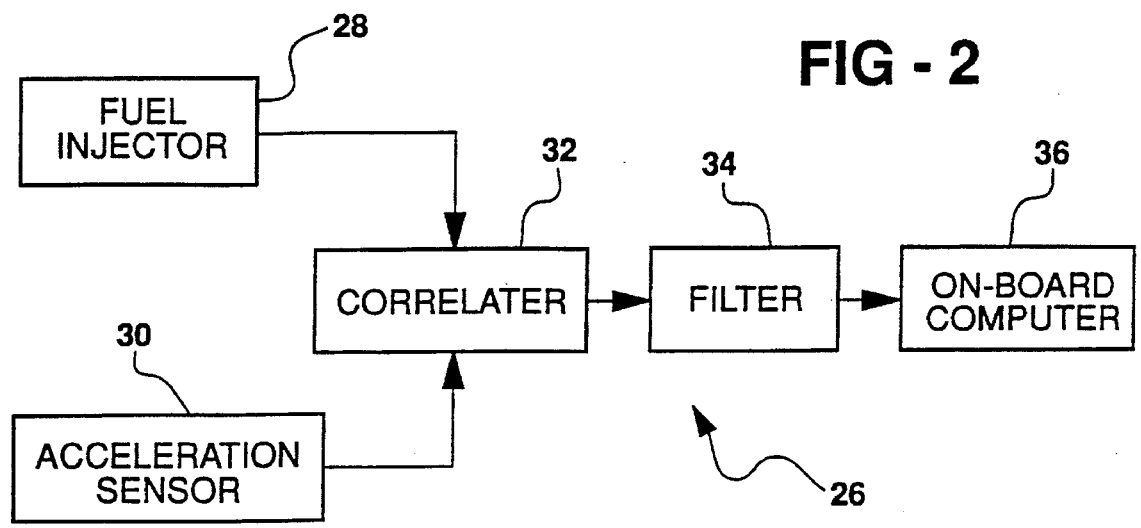
FIG. 2 is a block diagram of one of the embodiments of the misfire detection assembly according to the present invention.

Referring to FIG. 2, a misfire detection assembly is generally indicated at 26. The misfire detection assembly 26 receives an input from both a sensor, in one embodiment a fuel injector 28, and an output sensor 30. Although the sensor 28 may sense any defined event, the input received from the fuel injector 28 is the time each individual cylinder is fired. The signal received from the output sensor 30 depends on the type of sensor used. In one embodiment, the output sensor 30 is an acceleration sensor. In other embodiments, the output sensor 30 may be a manifold pressure sensor, an intake manifold pressure sensor, an oil pressure sensor, and the like. The type of output sensor 30 is not a part of the present invention.

The misfire detection assembly 26 includes a correlator 32 which is electrically connected to the fuel injector 28 and the output sensor 30. The correlator 32 correlates the firing events detected from the fuel injector 28 and the output signal created by the output sensor 30. More specifically, the correlator 32 aligns the outputs of the fuel injector 28 and the output sensor 30 such that a firing event created by the fuel injector 28 corresponds with the resulting output attributed to the firing event received by the output sensor 30. In one embodiment, the output signal is the acceleration signal of the crankshaft.

Once the output signal has been correlated with the firing events created by the fuel injector 28, a filter 34, which is electrically connected to the correlator 32, receives the output signal. The filter 34 creates a threshold signal to compare the output signal thereagainst to identify the firing events exceeding the threshold signal. The threshold signal is a dynamic signal and varies depending on the conditions in which the internal combustion engine 12 is operating. If the firing events exceed the threshold signal, it is determined that the firing event is a proper firing. If, however, the firing event does not exceed the threshold signal, the firing event is considered a misfire.

A recorder 36 is electrically connected to the filter 34 and records the firing events exceeding the threshold signal. The recorder 36 may be a microprocessor, an on-board computer, or an on-board diagnostics computer. The recorder 36 records the firing events and the misfiring events in a format to be retrieved for engine diagnostics at a later time.

Designing an optimal filter to be used in the misfire detection assembly 26 incorporates an application of genetic programming. It should be noted that the design method described below can be used for several measurable events, both within and outside the motor vehicle environment. A detailed discussion of genetic programming will not be included in the discussion. For a detailed discussion of genetic programming, reference is made to U.S. Pat. No. 5,136,686, issued to Koza on Aug. 4, 1992, the disclosure of which is hereby expressly incorporated.

The creation of the optimal filter which is used to separate data collected from the internal combustion engine 12 includes the use of a plurality of usable filters. The usable filters are programs designed to filter the firing events into proper firing events and misfire events. Although these filters are usable, they are inferior because they are either unfit or inaccurate. Fitness is a function of robustness. Robustness is defined as the ability for a filter to respond to several different environments accurately. Accuracy is defined as properly separating the data with as little misalignment of data as possible. More specifically, accuracy is a function of how many misfires are labeled as proper firings and how many proper firings are labeled misfires, given a population of firing events. As it may be appreciated, incorrect separation of the firing events will result in unnecessarily costly modifications and engine design as required by governmental regulations and legislation.

Figure 3:
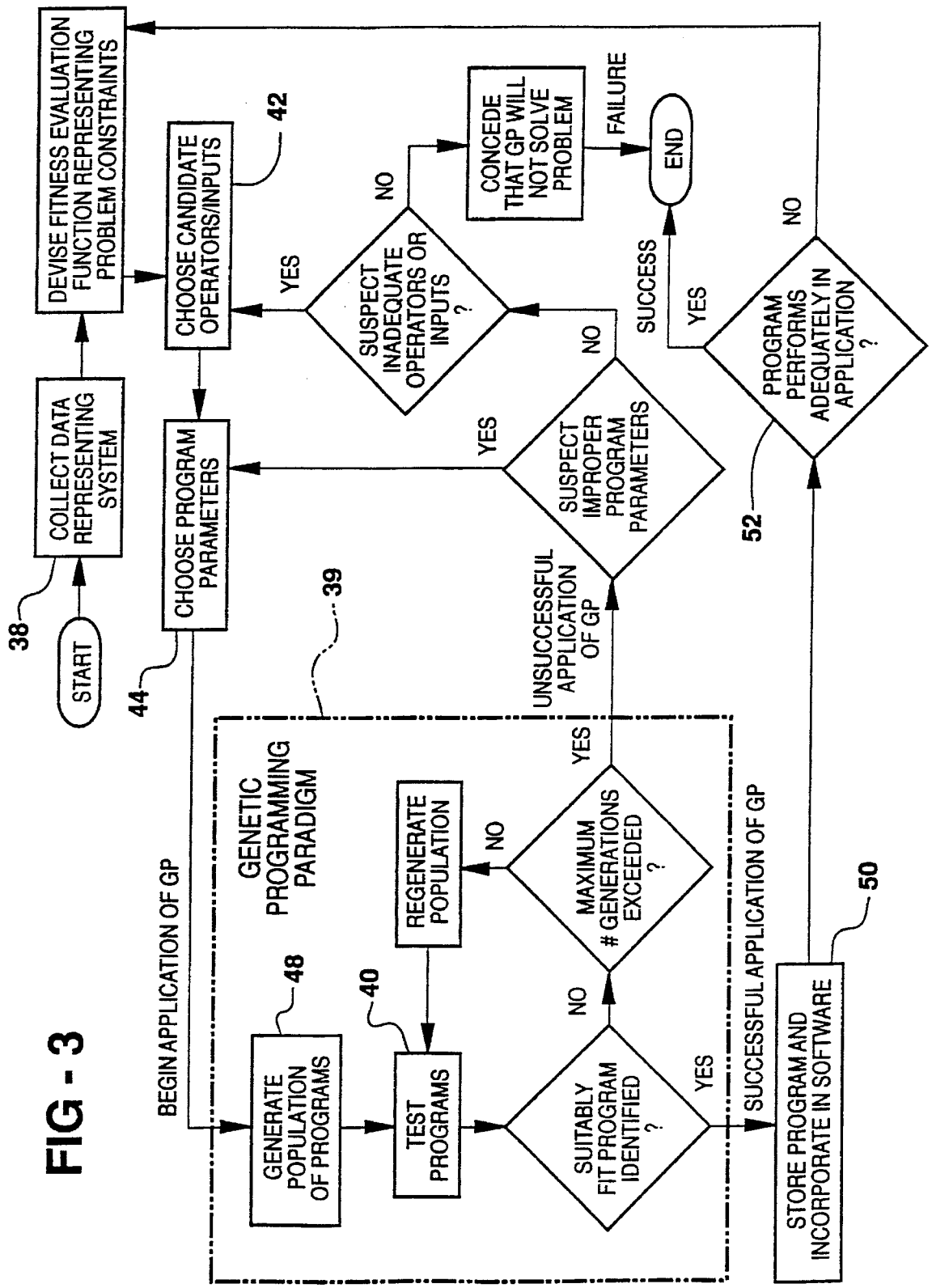
FIG. 3 is a flowchart representing a method for making the filter of the misfire detection assembly.
Figure 5A:
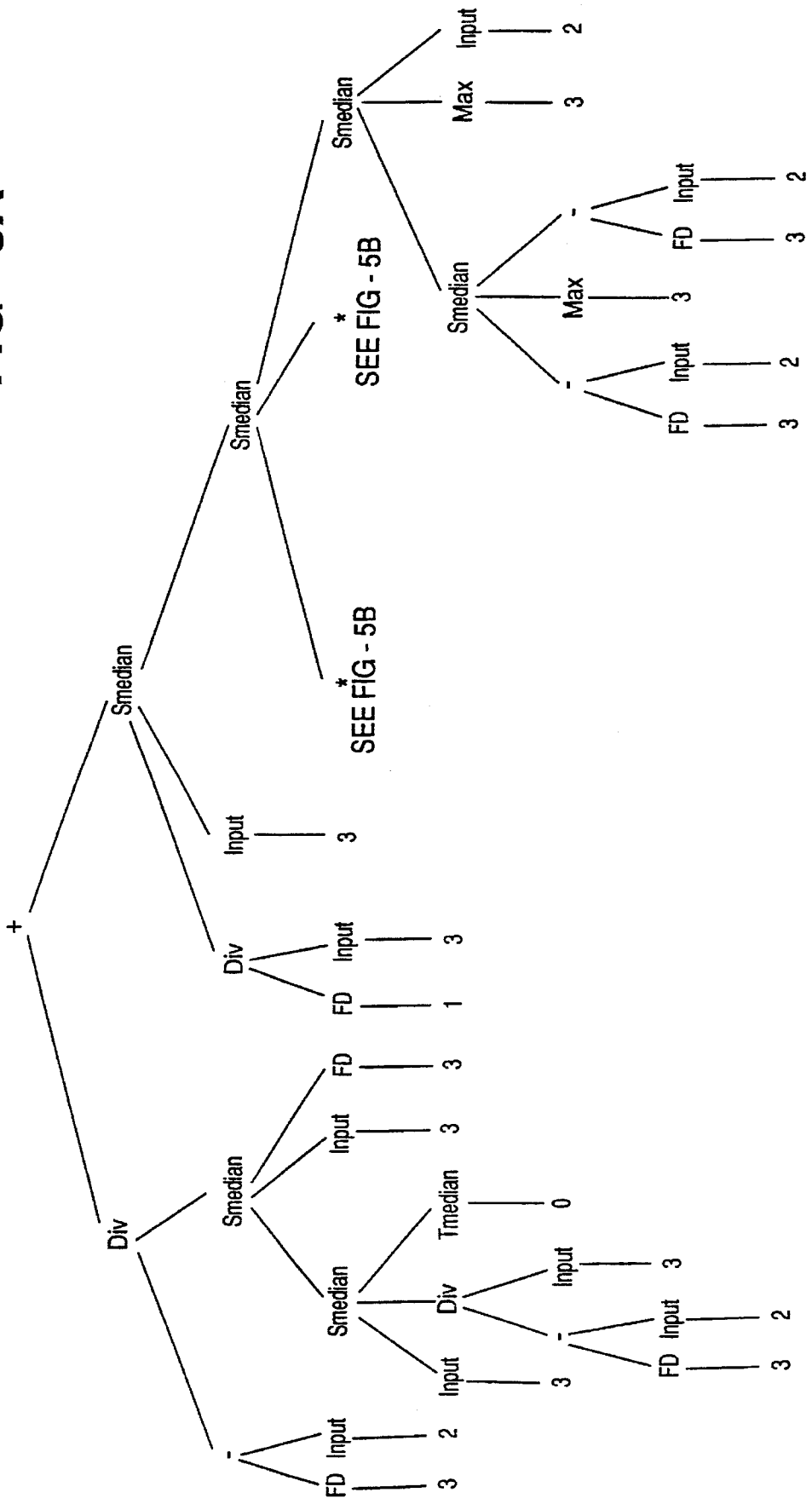
FIGS. 5A and 5B together form a graphic representation of another example of a filter.
Figure 5B:
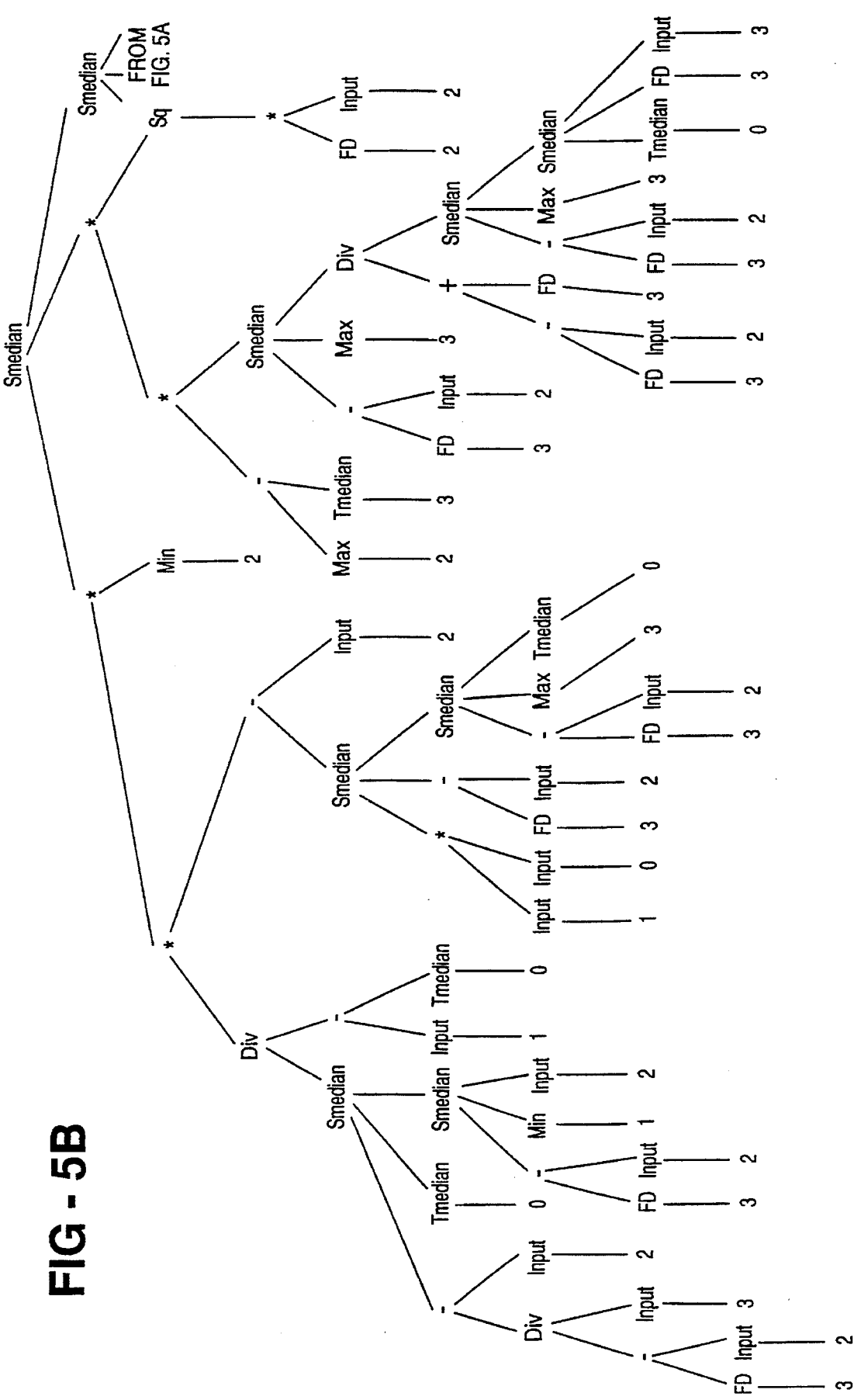

The first step in creating an optimal filter is collecting data from an internal combustion engine, as shown at 38 in FIG. 3. The data is collected through tests wherein an internal combustion engine is purposely misfired at known test points so that determinations of robustness and accuracy may be made.

More specifically, the plurality of usable filters make judgments as to which category the data should be entered. Once the data has been collected, each of the plurality of usable filters are operated using the data collected to separate the data into a proper firing category and a misfiring category. Once the usable filters have operated with the data, they are tested for robustness and accuracy, to determine which of a portion of the plurality of usable filters are the most successful. The portion of usable filters are then modified to create a new population of usable filters. The modification or regeneration of usable filters is brought about by crossing over portions of each of the usable filters to create new usable filters, constituting a new population of usable filters.

The new population of usable filters are then tested to identify the optimal filter which is used on-board the motor vehicle 10 to accurately detect misfire events created by the internal combustion engine 12. The step of modifying the new population of usable filters is iterative. More specifically, a new population of usable filters is constantly being generated so that the optimization of the population of usable filters is increased rendering the optimal filter more powerful with each new generation.

The new populations of usable filters are tested to determine their fitness. Fitness is a function of robustness which, in turn, is a function of the mean value of the firing population and the mean value of the misfiring population. Therefore, a necessary step in the testing of each new population of usable filters is measuring a firing mean value and misfiring mean value. Also, with each new population of usable filters, the accuracy of each of the new population of usable filters is measured. The testing of the new populations will be discussed in greater detail subsequently.

Referring to FIG. 3, the data collected 38 is used to devise a fitness evaluation function representing the problem constraints associated with an internal combustion engine in a motor vehicle. Operators and operands are chosen 42 to manipulate the data collected. Program parameters are chosen 44 and, using the operators and operands, the genetic programming paradigm generator 39 generates a population of programs 48 to be tested to determine the fitness and accuracy thereof. The programs are tested at 40 whereafter it is determined whether a suitably fit program is identified. More specifically, it is at this point it is determined whether an optimal filter exists. If an optimal filter has not been identified, it is determined whether the program has generated a maximum number of new generations of programs. If not, the programs are modified using cross over techniques wherein the new generation of programs is again tested.

If, however, the maximum number of new generations has exceeded a predetermined number, a determination as to whether improper program parameters or inadequate operators or operands have been chosen. If so, new program parameters, operators, and/or operands are chosen wherein the plurality of usable filters are modified via the genetic programming paradigm generator 39 to identify the optimal filter for the set up data. However, if the program parameters, operators, and/or operands are not inadequate, it is conceded that the genetic programming paradigm generator 39 will not accurately solve the problem, i.e., the genetic programming paradigm will not be able to identify the optimal filter.

Once an optimal filter has been identified, it is stored at 50 and incorporated into the on-board software and hardware. That program is then tested at 52 to determine whether the program performs adequately in the application. More specifically, the optimal filter is tested with an internal combustion engine to determine whether it accurately and robustly identifies misfires from a population of firing events. If the program does not adequately perform, a new fitness evaluation is devised. If the optimal filter does perform well, the genetic programming paradigm generator 39 has treated the optimal filter to be used in combination with the specific internal combustion engine and motor vehicle.

Accuracy is one of the requirements used to identify the optimal filter. To be accurate, a filter must minimize the number of errors, either false positives or false negatives. Accuracy is defined by the following equation:

$$\text{Accuracy} = \frac{K}{L * \text{errors}} \quad (1)$$

wherein K and L are arbitrary gain factors related to the number of errors which are deemed permissible. By definition, a higher value of accuracy is desired. K being an arbitrary constant, may be made large which would effectively weed out inferior filters rapidly. This is not, however, desired at the outset because inferior filters may include portions or subprograms which are superior in nature. Allowing these filters to remain in the genetic programming process will increase the opportunity for these superior branches to be utilized by the optimal filter. Having said this, K may be varied over time to eventually weed out inferior filters by increasing the value of K each time a new population of filters is created.

Equation (1) treats all errors equally. However, false positive errors, namely errors created by the filter which indicate that a misfire has occurred when, in fact, no misfire has occurred, are more damaging to the automotive industry because unnecessary costs in research and development will occur for no reason. For this reason equation (1) is modified as follows:

$$\text{Accuracy} = \frac{K}{(L * \text{false pos.} + M * \text{false neg.})} \quad (2)$$

wherein K,L, and M are constants with L>M. This expression of accuracy penalizes a filter which produces false positive errors. Again, as with equation 1, accuracy is deemed optimal as its value increases.

Having found an accurate filter, the filter must be tested to determine or quantify its robustness. Robustness is defined as the ability of the filter to separate the proper firing events from the misfire events. Mathematically, this is achieved by separating the mean of each of the sets of events as much as possible. The more robust the filter, the greater the separation between these values. A separation factor (SF) identifies or quantifies the robustness of a particular filter. In one embodiment, the separation factor identifies the separation between the mean value of the misfire events and the mean value of the proper firing events. The separation factor (SF) is defined as:

$$SF = \frac{\overline{F_{misfiring}(\bullet)} - \overline{F_{firing}(\bullet)}}{\sigma_{F_{misfiring}}(\bullet) + \sigma_{F_{firing}}(\bullet)} \quad (3)$$

wherein $F_{misfiring}(\bullet)$ is the mean of a set of misfire filter judgments when the engine is misfired;

$\sigma_{Fmisfiring}(\bullet)$ is the standard deviation of that set;

$F_{firing}(\bullet)$ is the mean of a set of misfire filter judgments when engine fired properly; and $\sigma_{Ffiring}(\bullet)$ is the standard deviation of that set. Once an accurate and robust filter is created, a determination must be made as to whether a more robust or accurate filter will be created. The fitness of an accurate and robust filter is defined as:

$$\text{Fitness} = \frac{1}{\text{errors} + \frac{20}{SF}} \quad (4)$$

The final performance criteria of a filter is defined as the performance beyond which further improvements will not be made after a reasonable length of time, i.e., the point at which the filters have stopped improving, given that they have met the minimum requirements.

Figure 4:
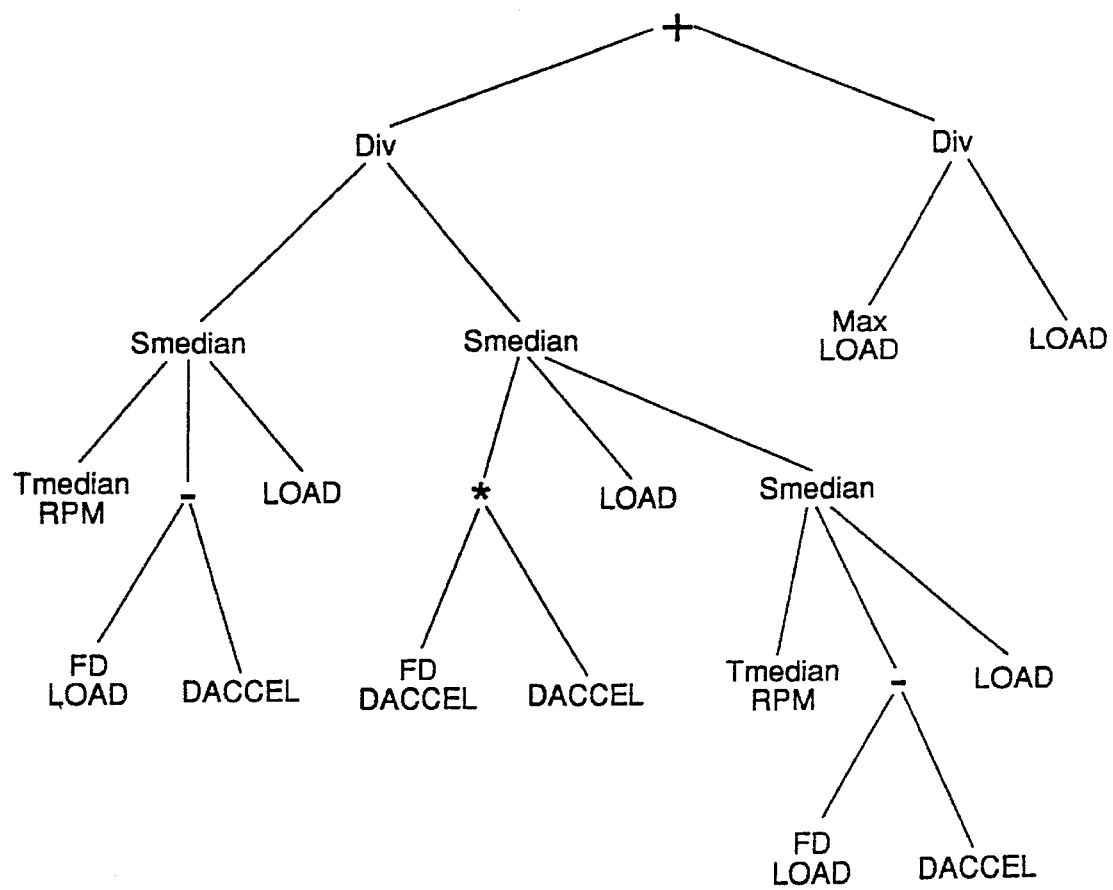
FIG. 4 is a graphic representation of an example of a filter developed by a method.

The method has identified two different filters which may be used as they are both accurate and robust. These filters are graphically represented in FIGS. 4, 5A and 5B. (In FIGS. 5A and 5B, 0, 1, 2, and 3, are RPM, ACCEL, DACCEL and LOAD, respectively.) The inputs of these programs are at the ends of the branches. Two of the inputs for these programs are the revolutions per minute, RPM, of the internal combustion engine 12 and the acceleration, ACCEL, of the crankshaft. A third input is deviant acceleration, DACCEL, which is the AC component of the acceleration signal. Finally, the last input is the load, LOAD, which is being placed on the engine. A misfire is strongly affected by the load on the engine. The higher the load, the larger the acceleration deficit resulting from an engine misfire.

Other inputs used in these filters include a forward derivative, FD, which is used in conjunction with the above-identified inputs to create a new set of inputs. Also, time and spatial median operations, TMEDIAN and SMEDIAN, respectively, are used to modify the first four identified inputs. The time median operation removes outliers. More specifically, the time median minimizes the effect of small events such as a single cylinder misfire. The spatial median SMEDIAN operation locates the median firing event for a given set of data. Time windowed maximum MAX, minimum MIN, and average AVE, of the first four inputs are also used. Because the misfire detection task consists of attempting to identify anomalous events, minimum and maximum functions are helpful.

The operators used in the programs are standard addition, subtraction, multiplication, and division, represented by +, −, *, and div., respectively. Also, the square operator, SQ, is used because some signals are indictitive of power which is better approximated by squared quantities.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method for creating an optimal filter to separate data collected from an internal combustion engine from a plurality of usable filters, the method comprising the steps of:

collecting data from the internal combustion engine;

operating each of the plurality of usable filters with the data collected to separate the data into a proper firing category and a misfire category;

separating the data into a false positive category and a false negative category;

modifying a portion of the plurality of usable filters to create a new population of usable filters;

testing each of the new population of usable filters to identify the optimal filter to be used on-board a motor vehicle to accurately detect misfire events created by the internal combustion engine;

weighting the data in the false positive category greater than the data in the false negative category; and measuring the accuracy of each of the new population of usable filters based on the weighted false positive category and the weighted false negative category.

2. A method as set forth in claim 1 wherein the step of testing each of the new population of usable filters includes the step of measuring a firing mean value and a misfiring mean value.

3. A method as set forth in claim 2 wherein the step of testing further includes measuring the fitness of each of the new population of usable filters.

4. A method as set forth in claim 3 wherein the step of modifying the population of usable filters is iterative.

5. A method for creating an optimal filter to separate data collected from an internal combustion engine from a plurality of usable filters, the method comprising the steps of:

collecting data from the internal combustion engine;

operating each of the plurality of usable filters with the data collected to separate the data into a proper firing category and a misfire category;

modifying a portion of the plurality of usable filters to create a new population of usable filters; and testing each of the new population of usable filters to identify the optimal filter to be used on-board a motor vehicle to accurately detect each of the events, the testing step including maximizing a difference between a firing mean value and a misfiring mean value.

6. A method as set forth in claim 5 including the step of separating the data in the misfire category into a false positive misfire category and a false negative misfire category.

7. A method as set forth in claim 6 including the step of weighting the data in the false positive misfire category greater than the data in the false negative misfire category.

* * * * *